United States Patent
Hirai et al.

(10) Patent No.: US 9,529,245 B2
(45) Date of Patent: Dec. 27, 2016

(54) IMAGE PICKUP APPARATUS INCLUDING FOCUS OPERATING APPARATUS AND FOCUS CONTROL METHOD

(75) Inventors: Keisuke Hirai, Utsunomiya (JP); Takayuki Kikuchi, Utsunomiya (JP); Shingo Isobe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 12/970,134

(22) Filed: Dec. 16, 2010

(65) Prior Publication Data

US 2011/0158627 A1 Jun. 30, 2011

(30) Foreign Application Priority Data

Dec. 28, 2009 (JP) ................................. 2009-298247

(51) Int. Cl.
*G03B 3/00* (2006.01)
*G03B 13/36* (2006.01)
*G03B 3/10* (2006.01)

(52) U.S. Cl.
CPC ................ *G03B 13/36* (2013.01); *G03B 3/10* (2013.01)

(58) Field of Classification Search
CPC ............... G03B 3/00; G03B 3/02; G03B 3/10; G03B 3/12; G03B 13/00; G03B 13/32; G03B 13/34; G03B 13/36
USPC ............................ 396/131, 79, 137; 348/345
See application file for complete search history.

(56) References Cited

U.S. PATENT DOCUMENTS

| 5,654,757 A | * | 8/1997 | Murakami et al. | 348/357 |
| 2003/0174414 A1 | * | 9/2003 | Sasaki | 359/698 |
| 2006/0104624 A1 | * | 5/2006 | Nakata et al. | 396/137 |
| 2007/0071435 A1 | * | 3/2007 | Moriya | 396/131 |

FOREIGN PATENT DOCUMENTS

| JP | 3785991 B2 | 6/2006 |
| JP | 2007-094133 A | 4/2007 |

OTHER PUBLICATIONS

Japanese Office Action for corresponding JP 2009-298247, mail date Nov. 28, 2013. English translation provided. References cited in earlier IDS dated Dec. 18, 2013.

* cited by examiner

*Primary Examiner* — Walter L Lindsay, Jr.
*Assistant Examiner* — Fang-Chi Chang
(74) *Attorney, Agent, or Firm* — Rossi, Kimms & McDowell LLP

(57) ABSTRACT

Provided is an image pickup apparatus including a lens apparatus and a focus operating apparatus. The lens apparatus includes a focus lens unit, a focus driving unit for driving the focus lens unit, and a drive control unit controlling to drive the focus driving unit and having a autofocus function. The focus operating apparatus includes a manual focus (MF) operating unit for manual focus adjustment and an MF command unit for outputting a command value based on an operation amount of the MF operating unit. When the MF operating unit is in operation, the drive control unit controls the focus driving unit based on the command value from the MF command unit. When the MF operating unit is not in operation, the drive control unit controls the focus driving unit to perform autofocus adjustment.

5 Claims, 16 Drawing Sheets

IMAGE PICKUP APPARATUS INCLUDING FOCUS OPERATING APPARATUS AND FOCUS CONTROL METHOD

BACKGROUND OF THE INVENTION

Field of the Invention

The present invention relates to an image pickup apparatus including a focus operating apparatus and a focus control method for the image pickup apparatus, and more particularly, to an image pickup apparatus including a lens apparatus having an autofocus (AF) function and a focus operating apparatus (focus demand) for operating the lens apparatus, and to a focus control method for the image pickup apparatus.

Description of the Related Art

Conventionally, as a focus operating apparatus for operating a focus lens of a lens apparatus, there has been used an apparatus in which an operating end has a limited operable rotation range and is capable of outputting a proportional command signal within the rotation range (non-endless operating apparatus), or an apparatus provided with an operating end of a type for outputting a command value corresponding to a relative operation amount (rotation amount) with its rotation range not limited (endless operating apparatus). Technologies related to an image pickup apparatus including the endless operating apparatus (endless focus demand) are described in Japanese Patent No. 3785991 and Japanese Patent Application Laid-Open No. 2007-094133.

In Japanese Patent No. 3785991, it is determined whether the endless operating apparatus or the non-endless operating apparatus is connected to a lens apparatus, and when the endless operating apparatus is connected to the lens apparatus, the lens apparatus converts a relative value into an absolute value.

In Japanese Patent Application Laid-Open No. 2007-094133, when a rotation count of the endless operating apparatus reaches a predetermined rotation count, a reset signal is output from a photo interpreter provided in the endless operating apparatus, then a lens is driven to a predetermined position to maintain the correspondence relationship between the rotation position of the endless operating apparatus and the position of the lens.

In a general operating apparatus used for the lens apparatus having the AF function, an AF mode is shifted to a manual mode by manual operation of an operating portion during control in the AF mode. When the manual operation is stopped, the manual mode is returned to the AF mode. Such a switching timing is determined by monitoring a change in command value which is caused by the manual operation. That is, when the command value does not change, it is determined that the manual operation is not performed. However, in a case where the operating portion is of an endless type, when the manual operation is performed beyond a command end point, a fixed end position command is output. When the fixed end position command continues to be output, it is determined that the manual operation is not performed even in the case where the manual operation is performing. Therefore, the control mode is returned to the AF mode. As a result, the operability of the operating portion is not common between the end range and another range.

Japanese Patent No. 3785991 discloses only the point that, when the operating portion included in the endless operating apparatus continues to be rotated, a command fixed to an upper limit value or a lower limit value is generated in the lens apparatus. Therefore, in a case where the endless operating apparatus is used for an AF lens, when the manual operation is performed out of a driving range, there is a possibility that the control mode is shifted to the AF mode at an unintended timing for a photographer.

Japanese Patent Application Laid-Open No. 2007-094133 discloses only the point that, when the relative position of the endless operating apparatus and the absolute position of the lens are deviated from each other, the operating portion is returned to a reference position to perform position correction.

SUMMARY OF THE INVENTION

Therefore, an exemplary object of the present invention is to provide an image pickup apparatus including an operating portion of which the operability is common between an end range and another range.

In order to achieve the above-mentioned object, an image pickup apparatus of the present invention includes: a lens apparatus including: a focus lens unit; a focus driving unit for driving the focus lens unit; and a drive control unit which controls to drive the focus driving unit and has an autofocus function; and a focus operating apparatus including: a manual focus operating unit for a manual focus adjustment; and a manual focus command unit for outputting a command value based on an operation amount of the manual focus operating unit, in which the drive control unit controls to drive the focus driving unit based on the command value from the manual focus command unit when the manual focus operating unit is in operation, and controls to drive the focus driving unit to perform autofocus adjustment when the manual focus operating unit is not in operation.

Further features of the present invention will become apparent from the following description of exemplary embodiments with reference to the attached drawings.

According to the present invention, the manual operation of the image pickup apparatus may be always recognized during control in the AF mode, and hence the operability of the operating portion is common between an end range and another range. Therefore, an effect of improving the operability of the lens apparatus is obtained.

DESCRIPTION OF THE EMBODIMENTS

Figure 1:
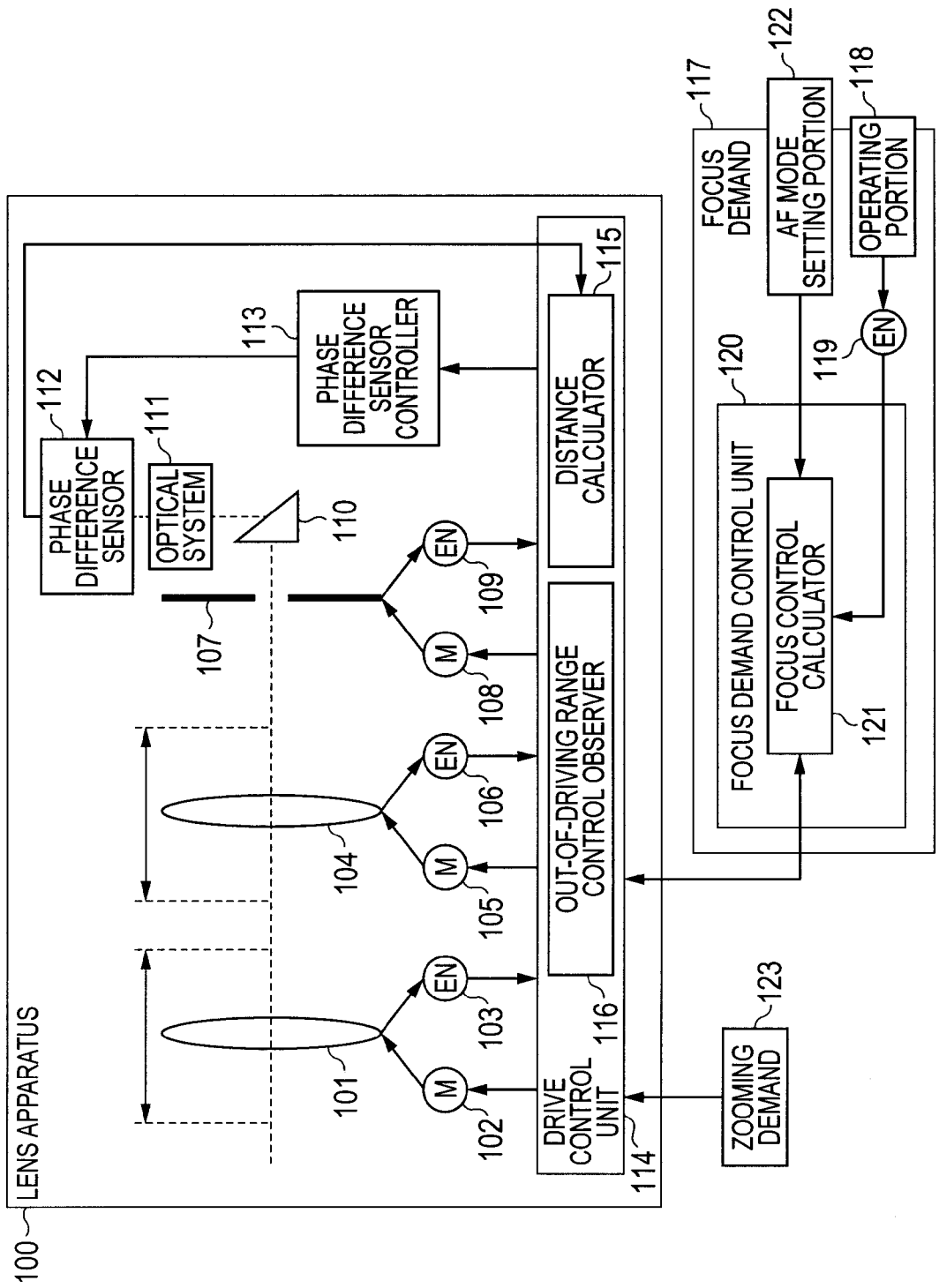
FIG. 1 is a block diagram illustrating a lens apparatus according to a first, third, or fourth embodiment of the present invention.

Hereinafter, embodiments of the present invention are described in detail with reference to the attached drawings.
First Embodiment FIG. 1 is a structural diagram illustrating an image pickup apparatus according to a first embodiment of the present invention.

A lens apparatus 100 includes a focus lens 101, a focus motor 102 serving as a focus driving unit for driving the focus lens 101, a zoom lens 104, a zoom motor 105 for driving the zoom lens 104, an iris 107, and an iris motor 108 for driving the iris 107. A position of the focus lens 101, a position of the zoom lens 104, and a position of the iris 107 are detected by a focus position detector 103, a zooming position detector 106, and an iris position detector 109, respectively, each of which includes a potentiometer or an encoder. The lens apparatus 100 further includes a separation optical system 110, an optical system 111, a phase difference sensor unit 112 having multiple phase difference sensors, and a phase difference sensor controller 113. A drive control unit 114 controls the focus lens 101, the zoom lens 104, the iris 107, and the phase difference sensor unit 112. The drive control unit 114 may drive the focus lens 101 based on a signal from the phase difference sensor group 112 to perform automatic focusing (AF). A distance calculator 115 calculates multiple distance values based on multiple detection values obtained from the phase difference sensor unit 112.

A focus demand (focus operating apparatus) 117 includes a focus demand control unit (manual focus (MF) command unit) 120, an AF mode setting portion 122, and an operating portion 118. The operating portion 118 is an operating unit (MF operating unit) which is mechanically endless and rotatable for manual focus adjustment. An out-of-driving range control observer 116 observes whether or not the operating portion 118 of the focus demand 117 described later is operated in a corresponding position out of the driving range of the focus lens 101. The focus demand 117 outputs a control amount of the focus lens 101 which corresponds to an operation amount of the operating portion 118 described later, to control the position of the focus lens 101. An operating portion position detector 119 includes a potentiometer or an encoder and detects a rotation amount of the operating portion 118. A focus control calculator 121 calculates a command value corresponding to the rotation amount of the operating portion 118. The AF mode setting portion 122 performs ON/OFF switching of an AF mode. A zooming demand 123 outputs a control amount of the zoom lens 104 which corresponds to an operation amount of a zoom operating portion (not shown).

Figure 2:
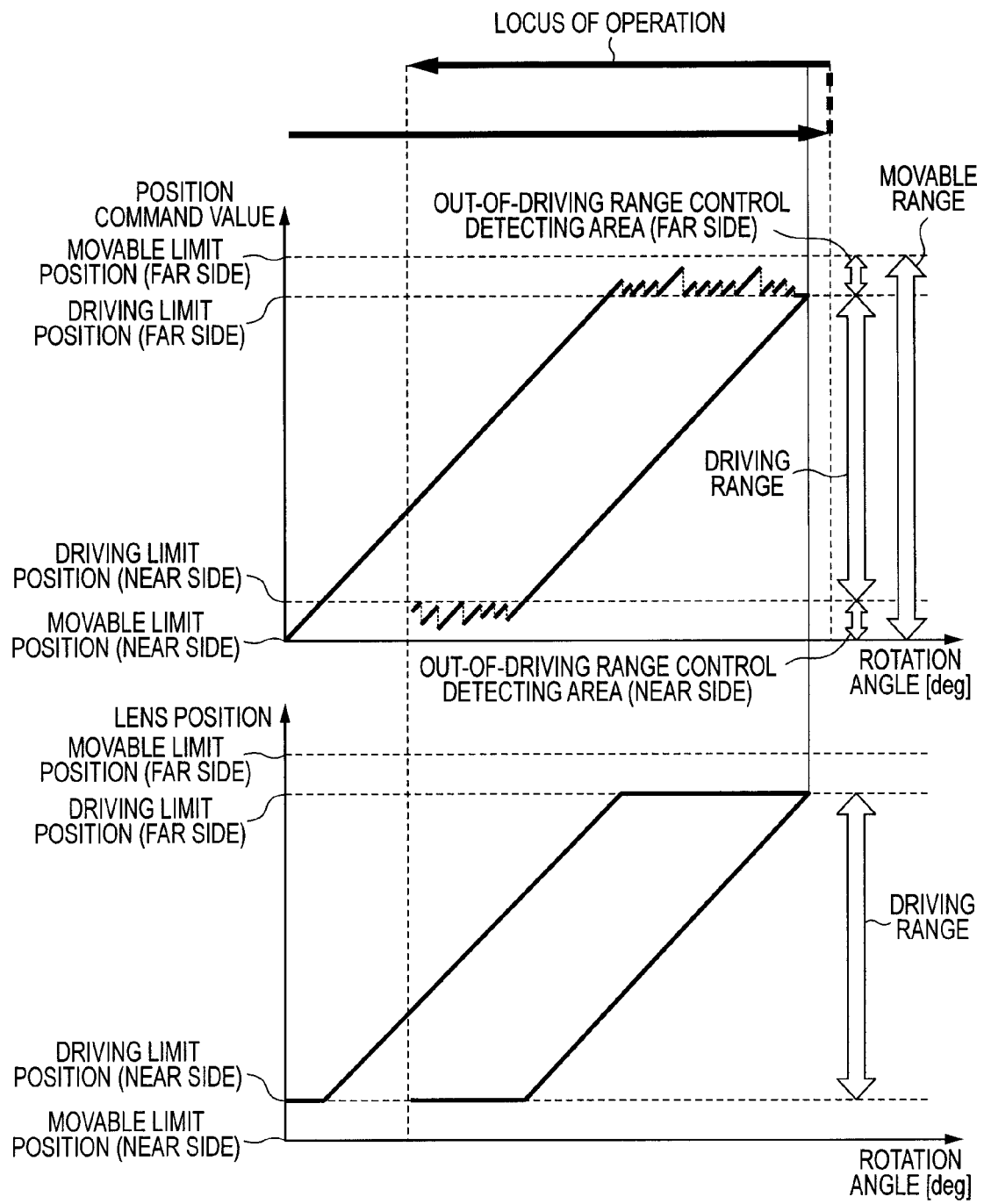
FIG. 2 illustrates relationships between a rotation angle of an operating portion and a position command value and between the rotation angle and a lens position in the first embodiment of the present invention.

FIG. 2 illustrates an example of a change in position command value output from the focus demand 117 by an out-of-driving range control observing process performed on the lens apparatus side and a command reference updating process performed on the focus demand side in a case where the operating portion 118 is operated out of a driving range of the focus lens 101. In FIG. 2, the abscissa axis indicates a rotation angle of the operating portion 118 and the ordinate axes indicate the position command value output from the focus demand 117 and a lens position. In FIG. 2, a driving range is a range in which the focus lens 101 is actually drive-controlled, and a movable range is a range including end portions to which the focus lens 101 may be moved in view of mechanical structure. In FIG. 2, the movable range except the driving range corresponds to a range out of the driving range. In FIG. 2, a driving limit position (far side or infinite side) indicates a position of a far-side end (or infinite-side end) of the driving range, and a driving limit position (near side or close side) indicates a position of a near-side end (or close-side end) of the driving range. In FIG. 2, a movable limit position (far side) indicates a far-side boundary position of the movable range, and a movable limit position (near side) indicates a near-side boundary position of the movable range. In FIG. 2, an out-of-driving range control detecting area (far side) is an area between the movable limit position (far side) and the driving limit position (far side) and set to detect far-side out-of-driving range control by a process described later. In FIG. 2, an out-of-driving range control detecting area (near side) is an area between the movable limit position (near side) and the driving limit position (near side) and set to detect a near-side out-of-driving range control by a process described later.

As illustrated in FIG. 2, the drive control unit 114 of the lens apparatus 100 determines whether or not the position command value input from the focus demand 117 has exceeded the driving limit position (value). In every determination that the position command value has exceeded the driving limit value, a reference position of the command value is updated and an update demanding command is sent to the focus demand control unit 120 to change the command value to the driving limit position. In this embodiment, in FIG. 2, it is assumed that the reference position is the driving limit position. As a result, when the operating portion 118 is operated out of the driving range, the position command value is not fixed to the driving limit position. Therefore, the out-of-driving range control observer observes the change in command value corresponding to the operation, to thereby determine whether or not the operating portion 118 is operated out of the driving range.

Figure 3:
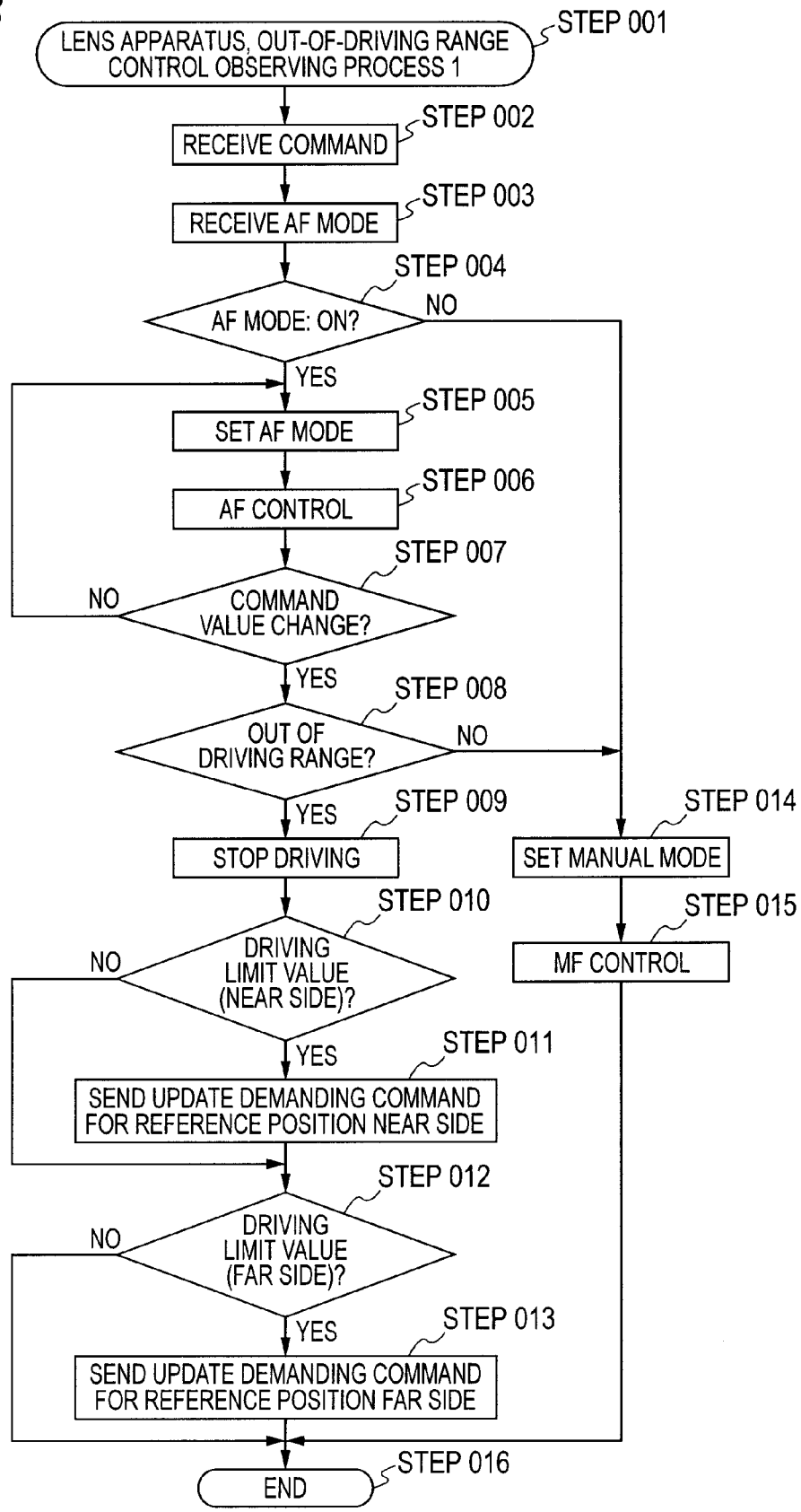
FIG. 3 is a flowchart illustrating an out-of-driving range control observing process of the lens apparatus according to the first embodiment of the present invention.

FIG. 3 is a process flowchart illustrating an out-of-driving range control observing process 1 of the drive control unit 114. Step 001 is the start of the out-of-driving range control observing process 1 periodically executed after a power supply is turned on and various initialization processes are completed. Then, the processing goes to Step 002. In Step 002, the command value output from the focus demand 117 is received and the processing goes to Step 003. In Step 003, the AF mode output from the focus demand 117 is received and the processing goes to Step 004. In Step 004, whether or not the received AF mode is an ON command is determined. When the AF mode is the ON command, the processing goes to Step 005. When the AF mode is not the ON command, the processing goes to Step 014. In Step 005, the AF mode is set and the processing goes to Step 006. In Step 006, the focus lens 101 is driven under the AF control and the processing goes to Step 007. In Step 007, whether or not the received command value has changed during a predetermined period is determined. When the command value has changed, the processing goes to Step 008. When the command value has not changed, the processing returns to Step 005. In Step 008, whether or not the received command value is out of the driving range is determined. When the command value is out of the driving range, the processing goes to Step 009. When the command value is within the driving range, the processing goes to Step 014. In Step 009, the driving of the focus lens 101 is stopped and the processing goes to Step 010. In Step 010, whether or not the received command value has reached the driving limit value (near side) is determined. When the command value has reached the driving limit value (near side), the processing goes to Step 011. When the command value has not reached the driving limit value (near side), the processing goes to Step 012. In Step 011, an update demanding command for reference position near side is sent to the focus demand 117 and the processing goes to Step 012. In Step 012, whether or not the received command value has reached the driving limit value (far side) is determined. When the command value has reached the driving limit value (far side), the processing goes to Step 013. When the command value has not reached the driving limit value (far side), the processing goes to Step 016. In Step 013, an update demanding command for reference position far side is sent to the focus demand 117 and the processing goes to Step 016.

In Step 014, the AF mode is changed to the manual mode and the processing goes to Step 015. In Step 015, the focus lens 101 is drive-controlled based on the received command value and the processing goes to Step 016. Step 016 is the completion of the out-of-driving range control observing process 1 of the lens apparatus. After the completion, the same process is repeated from Step 001 at predetermined time intervals.

Figure 4:
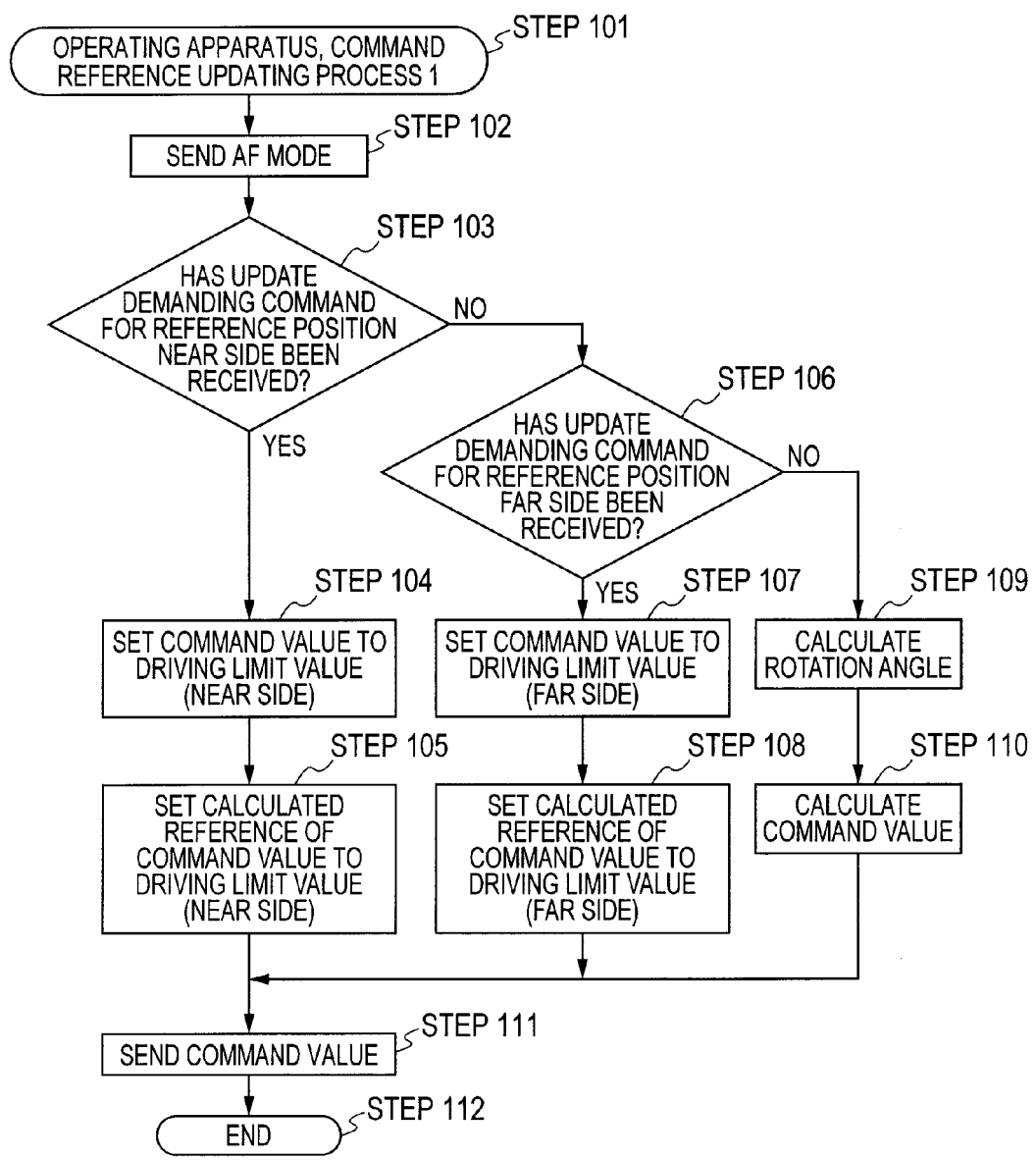
FIG. 4 is a flowchart illustrating a command reference updating process of an operating apparatus in the first embodiment of the present invention.

FIG. 4 is a process flowchart illustrating a command reference updating process 1 of the focus demand control unit 120. Step 101 is the start of the command reference updating process 1 periodically executed after the power supply is turned on and various initialization processes are completed. Then, the processing goes to Step 102. In Step 102, a set state of the AF mode setting portion 122 is sent and the processing goes to Step 103. In Step 103, whether or not the update demanding command for reference position near side has been received is determined. When the update demanding command for reference position near side has been received, the processing goes to Step 104. When the update demanding command for reference position near side has not been received, the processing goes to Step 106. In Step 104, the driving limit value (near side) is set as the command value and the processing goes to Step 105. In Step 105, the driving limit value (near side) is set as a calculated reference of the command value and the processing goes to Step 111.

In Step 106, whether or not the update demanding command for reference position far side has been received is determined. When the update demanding command for reference position far side has been received, the processing goes to Step 107. When the update demanding command for reference position far side has not been received, the processing goes to Step 109. In Step 107, the driving limit value (far side) is set as the command value and the processing goes to Step 108. In Step 108, the driving limit value (far side) is set as the calculated reference of the command value and the processing goes to Step 111.

In Step 109, a rotation angle of the operating portion 118 is calculated and the processing goes to Step 110. In Step 110, a command value corresponding to the calculated rotation angle is calculated. The command value is obtained by adding or subtracting a command change amount corresponding to the rotation angle to or from the calculated reference of the command value.

Next, the processing goes to Step 111. In Step 111, the calculated command value is output and the processing goes to Step 112. Step 112 is the completion of the command reference updating process 1 of the operating apparatus. After the completion, the same process is repeated from Step 101 at predetermined time intervals.

In this embodiment, when the drive control unit 114 receives the position command value from the focus demand 117, the drive control unit 114 determines whether or not the received position command value has exceeded the threshold value (driving limit value). When the position command value has exceeded the threshold value, a new position command value to be sent is demanded to the focus demand 117. Therefore, when a signal processing time (delay time) is allowable, the following may be performed. That is, not the driving limit value but a movable limit value is set as the threshold value. When the command value has exceeded the movable limit value, the driving limit value is set as the command value and the driving limit value is set as the calculated reference of the command value.

As is apparent from the structure, the process flows, and the characteristics indicating the relationships between the rotation angle of the operating portion and each of the position command value and the lens position as illustrated in FIGS. 1 to 4, whether or not the focus lens (unit) is manually operated out of the driving range may be accurately detected. Therefore, focus control may be realized in which the control mode is not shifted to the AF mode at an unintended timing for a photographer. As a result, an operation specification is common between a range out of the driving range and another range, and hence the operability may be improved.

Second Embodiment

Figure 5:
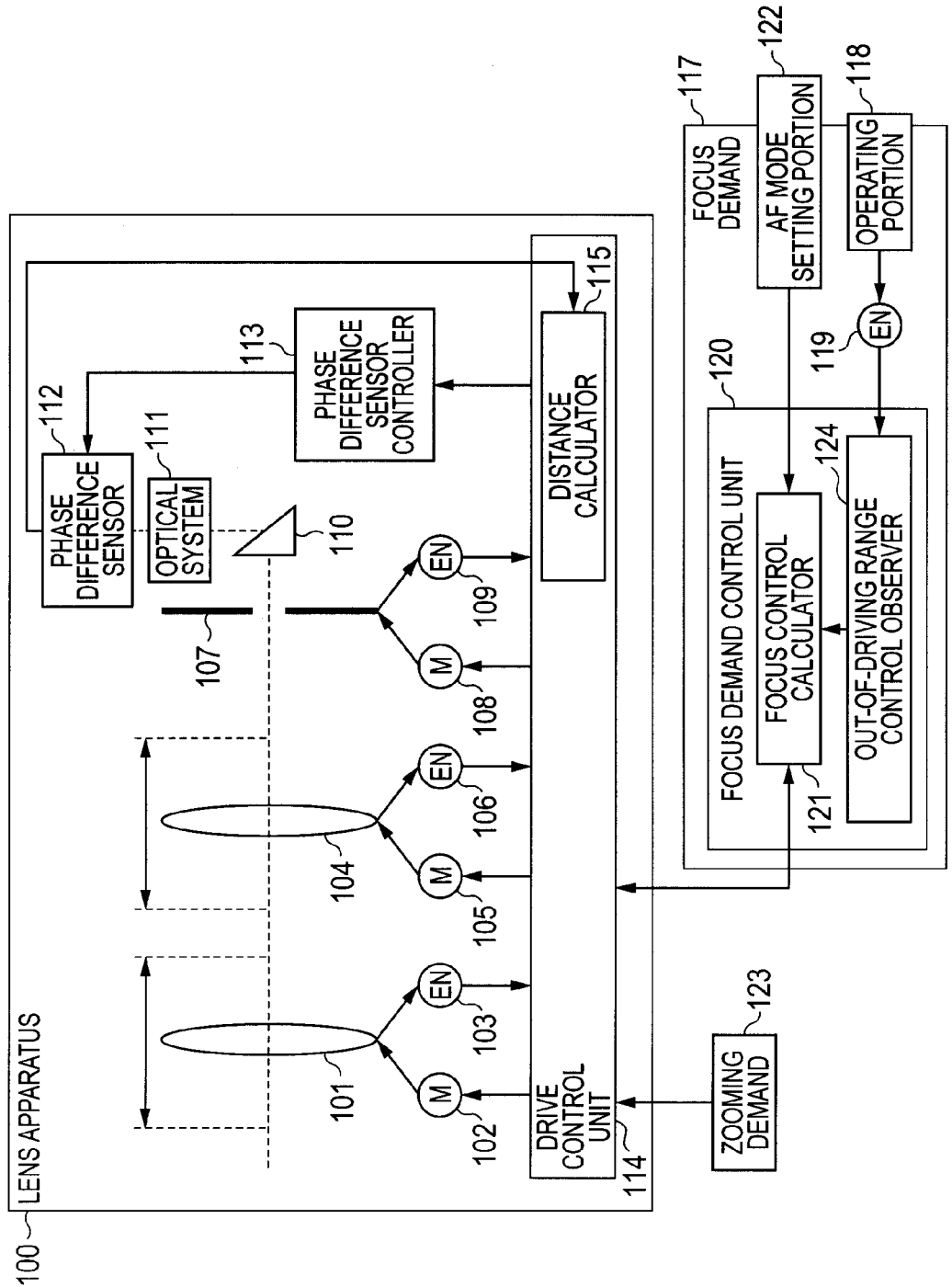
FIG. 5 is a block diagram illustrating a lens apparatus according to a second embodiment of the present invention.

FIG. 5 is a structural diagram illustrating an image pickup apparatus according to a second embodiment of the present invention.

In FIG. 5, the lens apparatus 100 to the distance calculator 115 and the focus demand 117 to the AF mode setting portion 122 have the same structures as in FIG. 1, and hence the description thereof is omitted.

In the first embodiment, whether or not the operating portion 118 is operated in the corresponding position out of the driving range is observed by the out-of-driving range control observer 116 of the drive control unit 114 included in the lens apparatus 100. In contrast to this, in the second embodiment, whether or not the operating portion 118 is operated in the corresponding position out of the driving range is observed by an out-of-driving range control observer 124 included in the focus demand control unit 120 located outside the lens apparatus 100.

Figure 6:
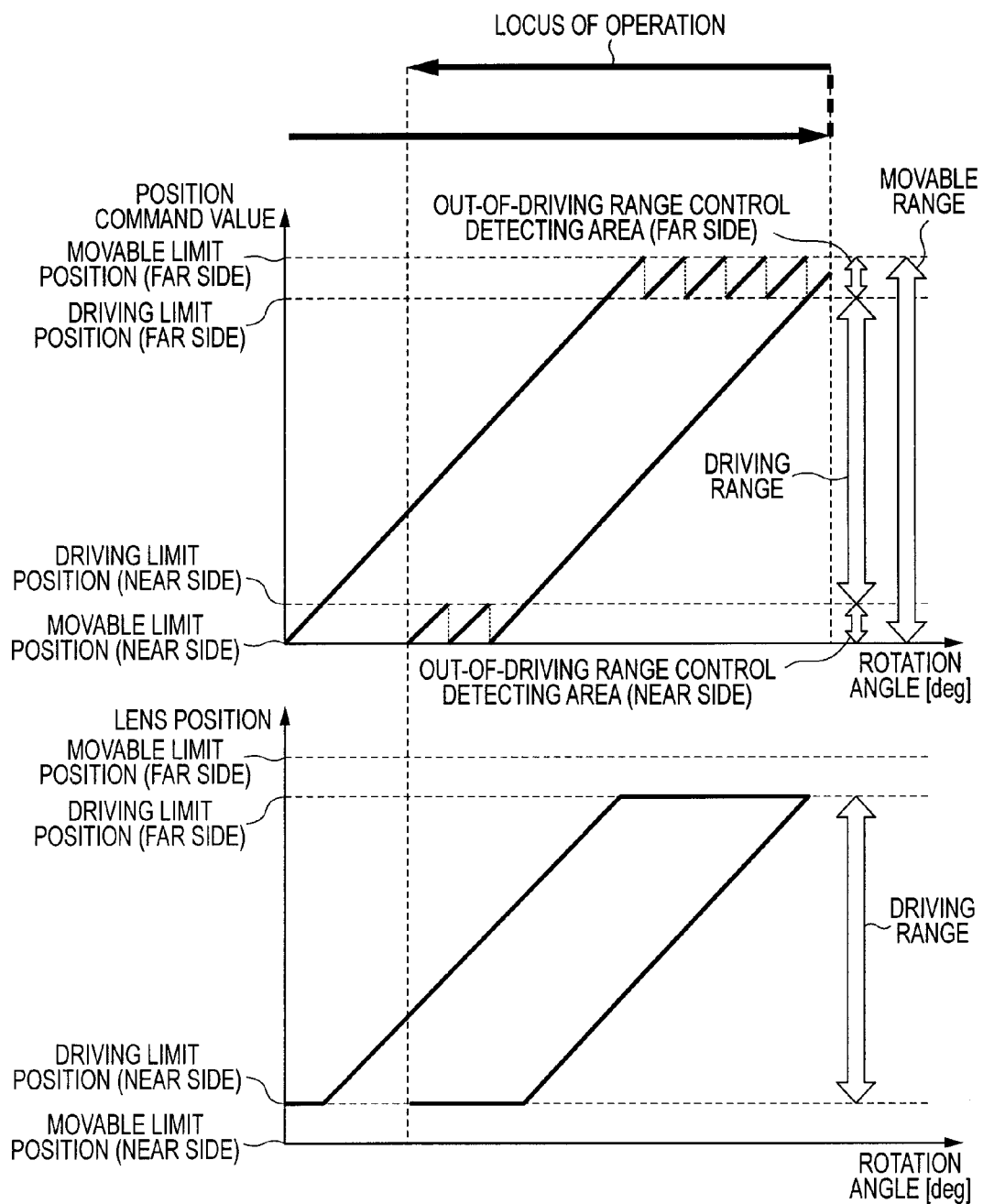
FIG. 6 illustrates relationships between a rotation angle of an operating portion and a position command value and between the rotation angle and a lens position in the second embodiment of the present invention.

FIG. 6 illustrates an example of a change in position command value output from the focus demand 117 during an out-of-driving range control observing process in a case where the operating portion 118 is operated out of the driving range of the focus lens 101 in the second embodiment. In the second embodiment, as illustrated in FIG. 6, in the case where the operating portion is operated out of the driving range, immediately after the position command value reaches the movable limit position, the position command value is changed to the driving limit position for updating and the driving limit position is set as the calculated reference of the command value. In this embodiment, in FIG. 6, it is assumed that the reference position is the driving limit position. As a result, when the operating portion 118 is operated out of the driving range, the position command value is not fixed to the driving limit position. Therefore, the out-of-driving range control observer 124 may observe the change in command value corresponding to the operation, to thereby determine whether or not the operating portion is operated out of the driving range.

Figure 7:
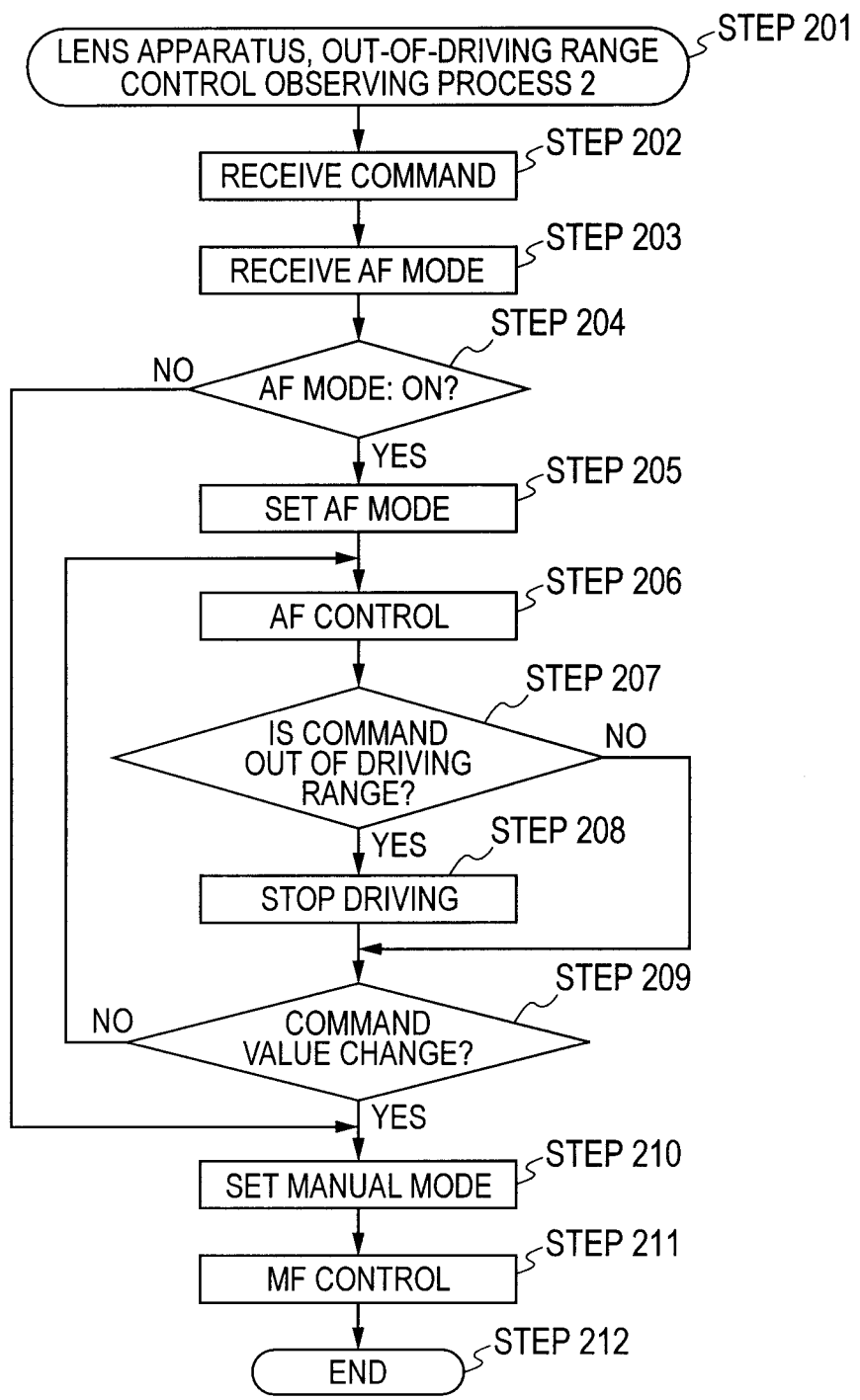
FIG. 7 is a flowchart illustrating an out-of-driving range control observing process of the lens apparatus according to the second embodiment of the present invention.

FIG. 7 is a process flowchart illustrating an out-of-driving range control observing process 2 of the drive control unit 114. In FIG. 7, Step 201 to Step 203 are the same as Step 001 to Step 003 in the out-of-driving range control observing process 1, and hence the description thereof is omitted. As illustrated in FIG. 7, in Step 204, whether or not the received AF mode is the ON command is determined. When the AF mode is the ON command, the processing goes to Step 205. When the AF mode is not the ON command, the processing goes to Step 210. In Step 205, the AF mode is set and the processing goes to Step 206. In Step 206, the focus lens 101 is driven under the AF control and the processing goes to Step 207. In Step 207, whether or not the received command value corresponds to a range out of the driving range is determined. When the command value corresponds to the range out of the driving range, the processing goes to Step 208. When the command value does not correspond to the range out of the driving range, the processing goes to Step 209. In Step 208, the driving of the focus lens 101 is stopped and the processing goes to Step 209. In Step 209, whether or not the received command value has changed during a predetermined period is determined. When the command value has changed, the processing goes to Step 210. When the command value has not changed, the processing goes to Step 206. In Step 210, the set AF mode is changed to the manual mode and the processing goes to Step 211. In Step 211, the focus lens 101 is drive-controlled based on the received command value. In this embodiment, the command value may be changed to a value between the driving limit position and the movable limit position. However, in the case of the command value out of the driving range, the focus lens 101 is in the drive stop state at the driving limit position (far side or near side). After the focus lens 101 is drive-controlled in Step 211, the processing goes to Step 212. Step 212 is the completion of the out-of-driving range control observing process 2 of the lens apparatus. After the completion, the same process is repeated from Step 201 at predetermined time intervals.

Figure 8:
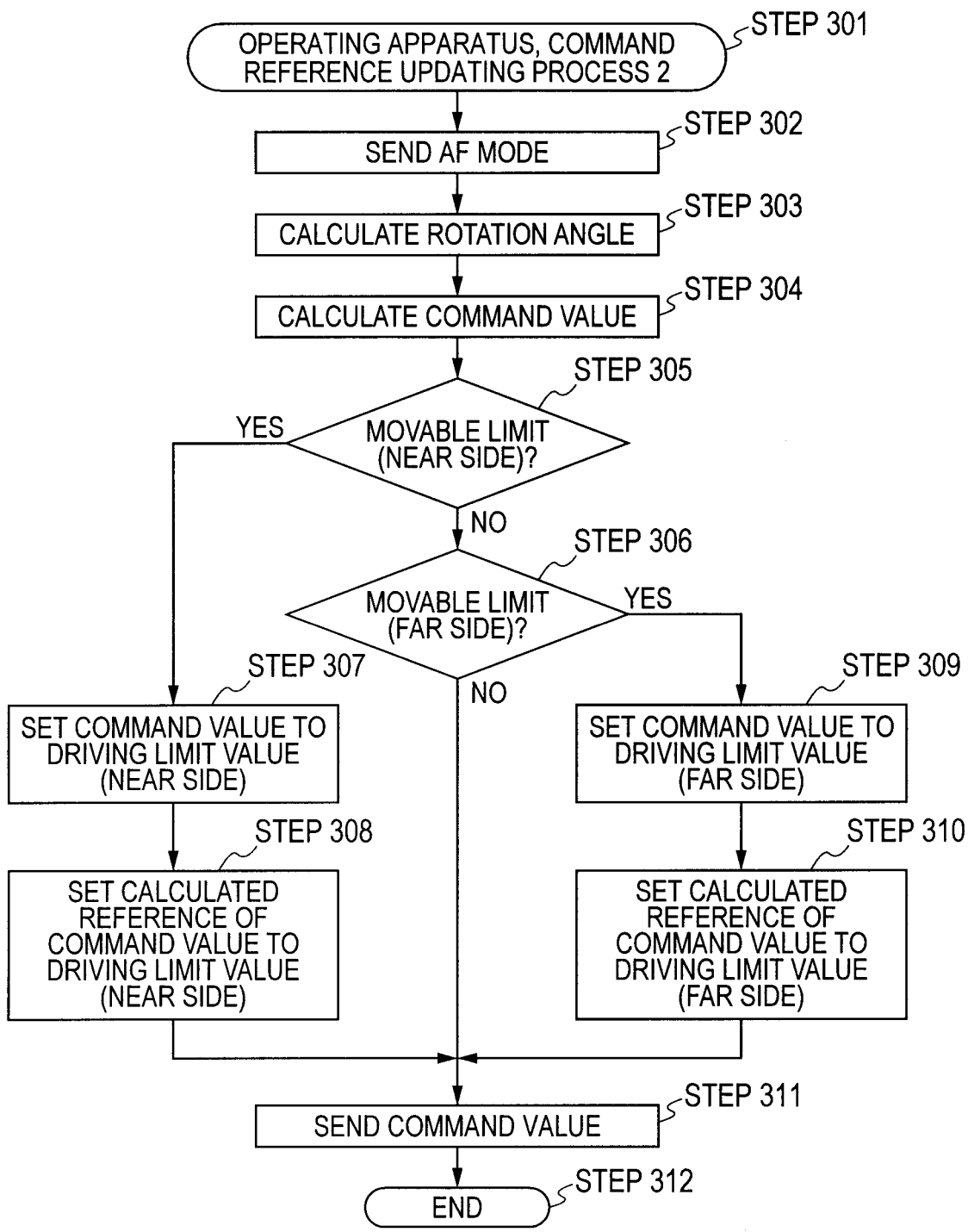
FIG. 8 is a flowchart illustrating a command reference updating process of an operating apparatus in the second embodiment of the present invention.

FIG. 8 is a process flowchart illustrating a command reference updating process 2 of the focus demand control unit 120. In FIG. 8, Step 301, Step 302, Step 303, Step 304, and Step 311 are the same as Step 101, Step 102, Step 109, Step 110, and Step 111, respectively, in the command reference updating process 1, and hence the description thereof is omitted. In Step 305, whether or not the calculated command value has reached the movable limit position (near side) is determined. When the command value has reached the movable limit position (near side), the processing goes to Step 307. When the command value has not reached the movable limit position (near side), the processing goes to Step 306. In Step 307, the driving limit position (near side) is set as the command value and the processing goes to Step 308. In Step 308, the driving limit position (near side) is set as a calculated reference of the command value and the processing goes to Step 311. In Step 306, whether or not the calculated command value has reached the movable limit position (far side) is determined. When the command value has reached the movable limit position (far side), the processing goes to Step 309. When the command value has not reached the movable limit position (far side), the processing goes to Step 311. In Step 309, the driving limit position (far side) is set as the command value and the processing goes to Step 310. In Step 310, the driving limit position (far side) is set as the calculated reference of the command value and the processing goes to Step 311. Step 312 is the completion of the command reference updating process 2 of the operating apparatus. After the completion, the same process is repeated from Step 301 at predetermined time intervals.

As is apparent from the structure, the process flows, and the characteristics indicating the relationships between the rotation angle of the operating portion and each of the position command value and the lens position as illustrated in FIGS. 5 to 8, whether or not the operation is performed out of the driving range may be accurately detected. Therefore, the control mode is not shifted to the AF mode at an unintended timing for a photographer. As a result, an operation specification is common between a range out of the driving range and another range, and hence the operability may be improved.

Third Embodiment

An image pickup apparatus according to a third embodiment has the same structure as the image pickup apparatus according to the first embodiment as illustrated in FIG. 1, and hence the description of the apparatus structure is omitted.

Figure 9:
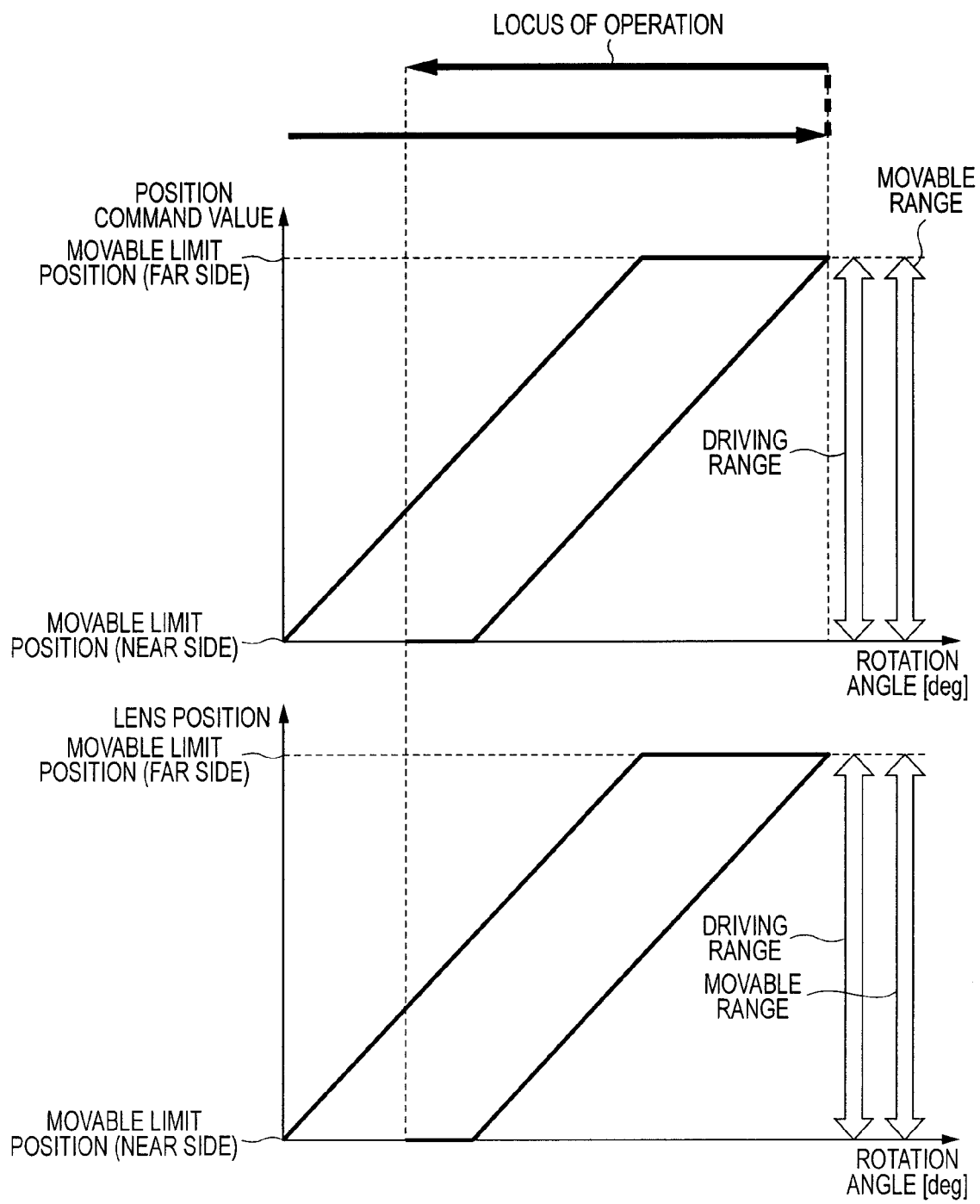
FIG. 9 illustrates relationships between a rotation angle of an operating portion and a position command value and between the rotation angle and a lens position in each of the third and fourth embodiments of the present invention.

FIG. 9 illustrates an example of a change in position command value output from the focus demand 117 during an out-of-driving range control observing process in a case where the operating portion 118 is operated out of the driving range in the structure described above. In FIG. 9, the abscissa axis indicates the rotation angle of the operating portion 118 and the ordinate axes indicate the position command value output from the focus demand 117 and the lens position. In FIG. 9, the driving range is a range in which the focus lens 101 is actually drive-controlled, and the movable range is a range including mechanical end portions to which the focus lens 101 is movable. In FIG. 9, a driving limit position (far side) indicates a position of a far-side end of the driving range, and a driving limit position (near side) indicates a position of a near-side end of the driving range. As illustrated in FIG. 9, when the operating portion is operated out of a movable limit position (near side), a constant movable limit value (near side) is output as the command value. When the operating portion is operated out of a movable limit position (far side), a constant movable limit value (far side) is output as the command value.

Figure 10:
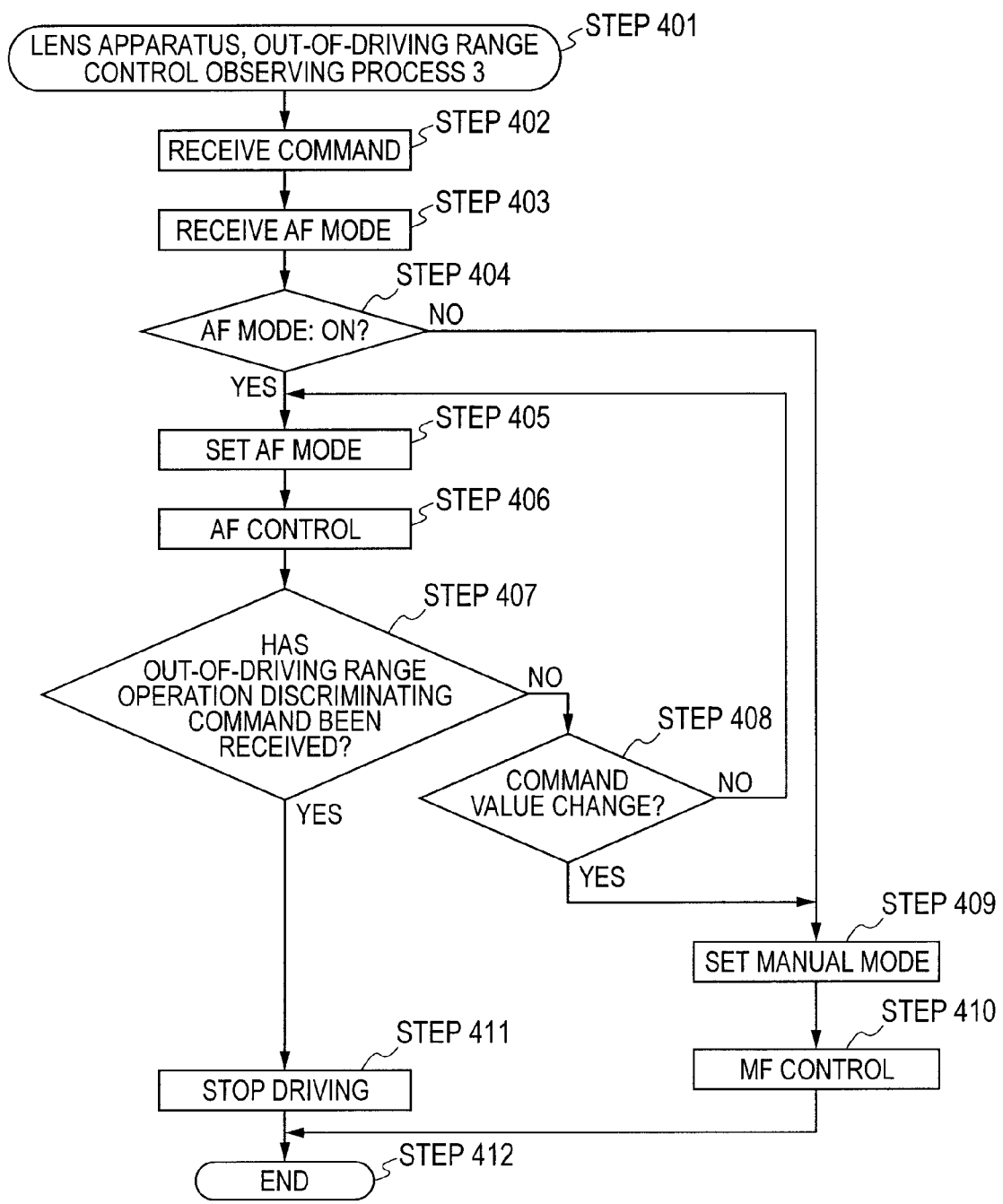
FIG. 10 is a flowchart illustrating an out-of-driving range control observing process of the lens apparatus according to the third embodiment of the present invention.

FIG. 10 is a process flowchart illustrating an out-of-driving range control observing process 3 of the drive control unit 114. In FIG. 10, Step 402 and Step 403 are the same as Step 002 and Step 003 in the out-of-driving range control observing process 1 described in the first embodiment, and hence the description is omitted. In Step 404, whether or not the received AF mode is the ON command is determined. When the AF mode is the ON command, the processing goes to Step 405. When the AF mode is not the ON command, the processing goes to Step 409. In Step 405, the AF mode is set and the processing goes to Step 406. In Step 406, the focus lens 101 is driven under the AF control and the processing goes to Step 407. In Step 407, whether or not an out-of-driving range operation discriminating command has been received from the focus demand 117 is determined. When the out-of-driving range operation discriminating command has been received, the processing goes to Step 411. When the out-of-driving range operation discriminating command has not been received, the processing goes to Step 408. In Step 408, whether or not the received command value has changed for a predetermined period is determined. When the command value has changed, the processing goes to Step 409. When the command value has not changed, the processing returns to Step 405. In Step 411, the driving of the focus lens 101 is stopped and the processing goes to Step 412. In Step 409, the set AF mode is changed to the manual mode and the processing goes to Step 410. In Step 410, the focus lens unit 101 is drive-controlled based on the received command value and the processing goes to Step 412. Step 412 is the completion of the out-of-driving range control observing process 3. After the completion, the same process is repeated from Step 401 at regular time intervals.

Figure 11:
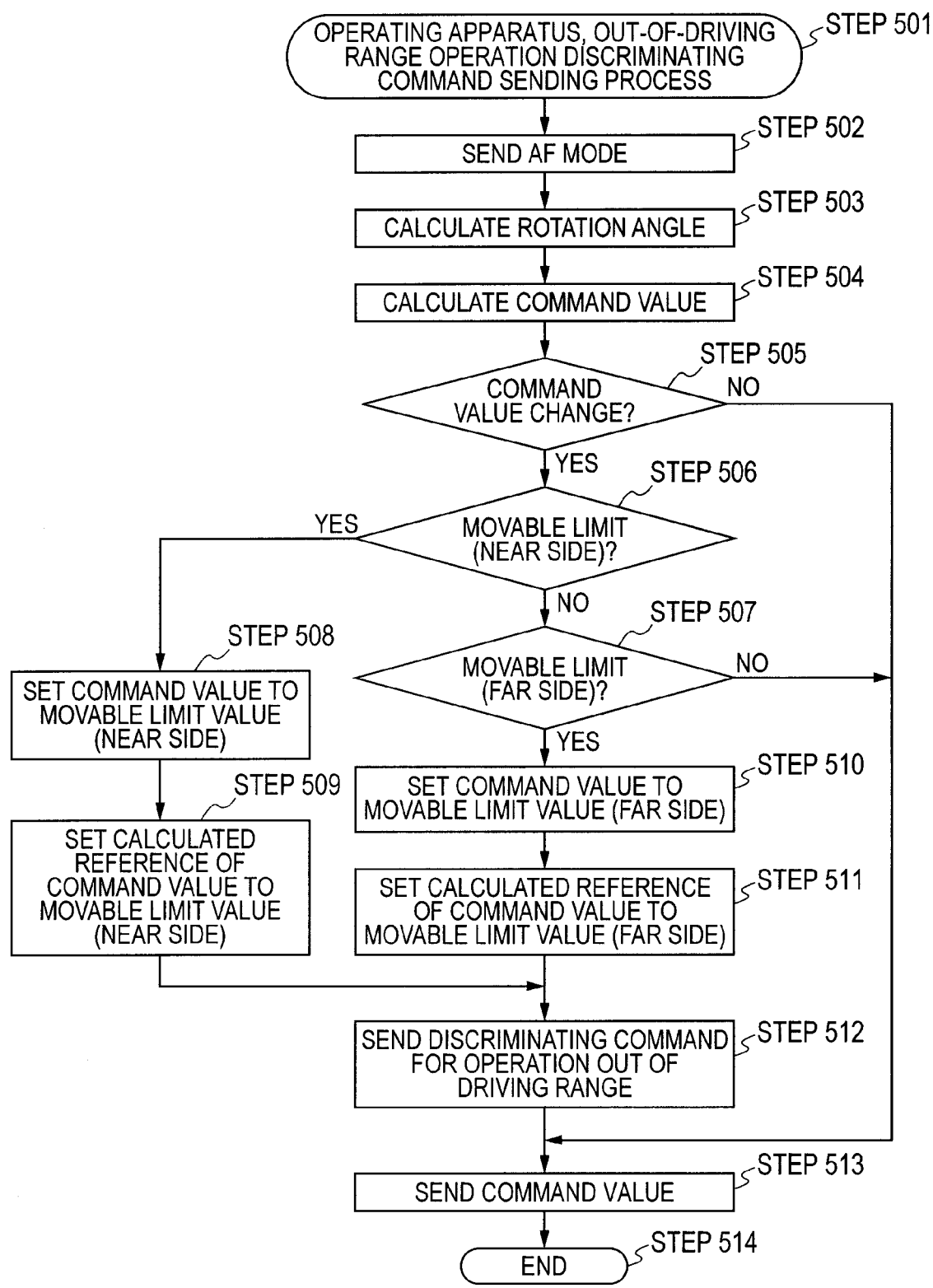
FIG. 11 is a flowchart illustrating an out-of-driving range operation discriminating command sending process of an operating apparatus in the third embodiment of the present invention.

FIG. 11 is a process flowchart illustrating an out-of-driving range operation discriminating command sending process performed in the focus demand 117. In FIG. 11, Step 501 to Step 504 are the same as Step 101, Step 102, Step 109, and Step 110, and hence the description is omitted. In Step 505, whether or not the command value has changed for a predetermined period is determined. When the command value has changed, the processing goes to Step 506. When the command value has not changed, the processing goes to Step 513. In Step 506, whether or not the command value has reached the movable limit value (near side) is determined. When the command value has reached the movable limit value (near side), the processing goes to Step 508. When the command value has not reached the movable limit value (near side), the processing goes to Step 507. In Step 508, the movable limit value (near side) is set as the command value and the processing goes to Step 509. In Step 509, the movable limit value (near side) is set as a calculated reference of the command value and the processing goes to Step 512. In Step 507, whether or not the command value has reached the movable limit value (far side) is determined. When the command value has reached the movable limit value (far side), the processing goes to Step 510. When the command value has not reached the movable limit value (far side), the processing goes to Step 513. In Step 510, the movable limit value (far side) is set as the command value and the processing goes to Step 511. In Step 511, the movable limit value (far side) is set as the calculated reference of the command value and the processing goes to Step 512. In Step 512, the discriminating command for operation out of driving range is sent to the drive control unit 114. In Step 513, the command value is sent to the drive control unit 114 and the processing goes to Step 514. Step 514 is the same as Step 112, and hence the description is omitted.

As is apparent from the structure, the process flows, and the characteristics indicating the relationships between the rotation angle of the operating portion and each of the position command value and the lens position as illustrated in FIGS. 1, 9, 10, and 11, whether or not the operation is performing out of the driving range may be accurately detected. Therefore, the control mode is not shifted to the AF mode at an unintended timing for a photographer. As a result, an operation specification is common between a range out of the driving range of the focus lens unit and another range, and hence the operability may be improved. In this embodiment, the out-of-driving range operation discriminating command is newly set. Alternatively, a predetermined out-of-driving range value may be set as the data of the command value to determine whether or not the operation is performing out of the driving range.

Fourth Embodiment

An image pickup apparatus according to a fourth embodiment has the same structure as the image pickup apparatus according to the first embodiment as illustrated in FIG. 1, and hence the description of the apparatus structure is omitted.

In the fourth embodiment, an example of a change in position command value output from the focus demand 117 during an out-of-driving range control observing process in a case where the operating portion 118 is operated out of the driving range is the same as the third embodiment described in FIG. 9, and hence the description is omitted.

Figure 12:
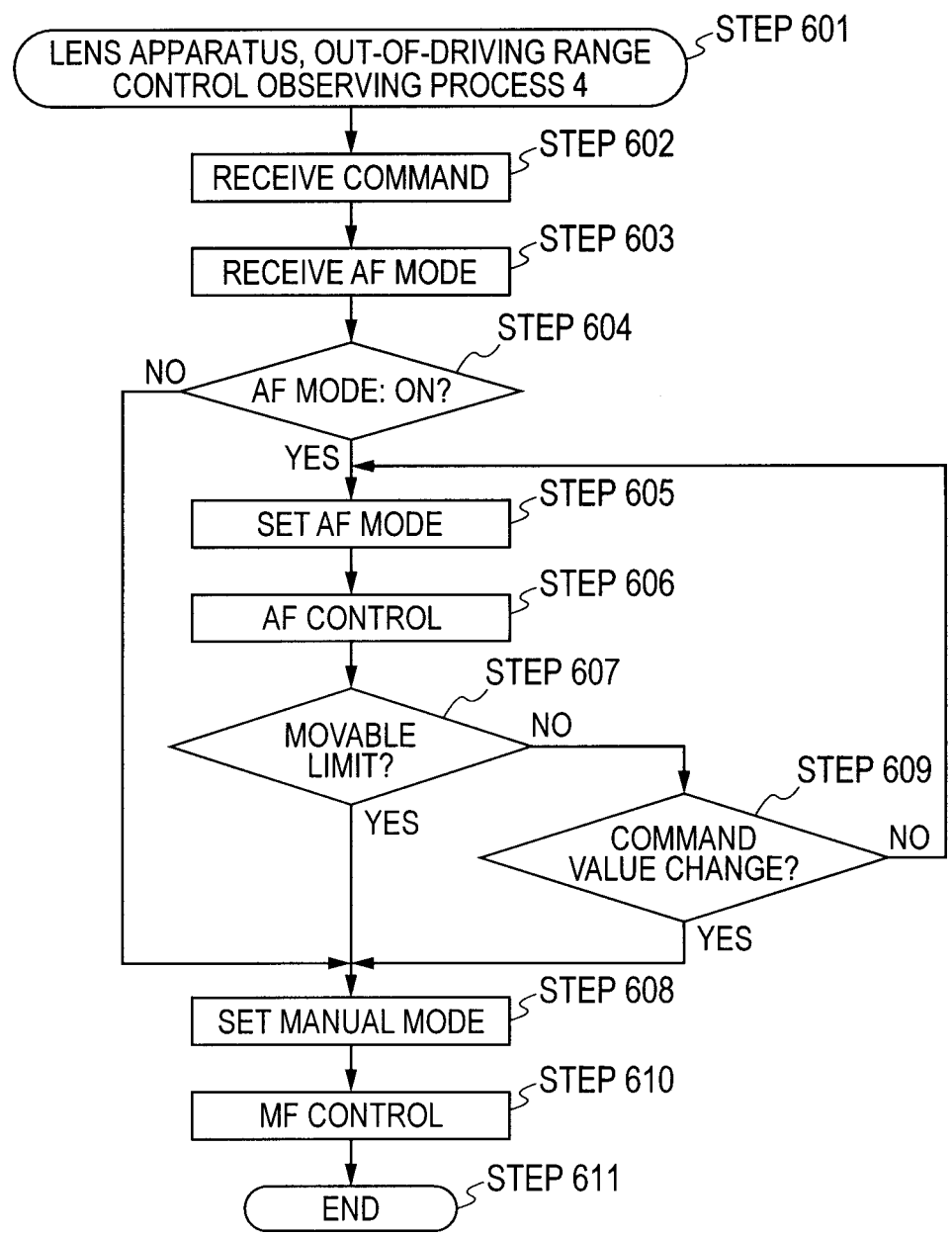
FIG. 12 is a flowchart illustrating an out-of-driving range control observing process of the lens apparatus according to the fourth embodiment of the present invention.

FIG. 12 is a process flowchart illustrating an out-of-driving range control observing process 4 of the drive control unit 114. In FIG. 12, Step 601 to Step 603 are the same as Step 001 to Step 003, and hence the description is omitted. In Step 604, whether or not the received AF mode is the ON command is determined. When the AF mode is the ON command, the processing goes to Step 605. When the AF mode is not the ON command, the processing goes to Step 608. In Step 605, the AF mode is set and the processing goes to Step 606. In Step 606, the focus lens 101 is driven under the AF control and the processing goes to Step 607. In Step 607, whether or not the received command value has reached the movable limit position is determined. When the command value has reached the movable limit position, the processing goes to Step 608. When the command value has not reached the movable limit position, the processing goes to Step 609. In Step 608, the set AF mode is changed to the manual mode and the processing goes to Step 610. In Step 609, whether or not the received command value has changed during a predetermined period is determined. When the command value has changed, the processing goes to Step 608. When the command value has not changed, the processing returns to Step 605. In Step 610, the focus lens 101 is drive-controlled based on the received command value and the processing goes to Step 611. Step 611 is the completion of the out-of-driving range control observing process 4. After the completion, the same process is repeated from Step 601 at regular time intervals.

Figure 13:
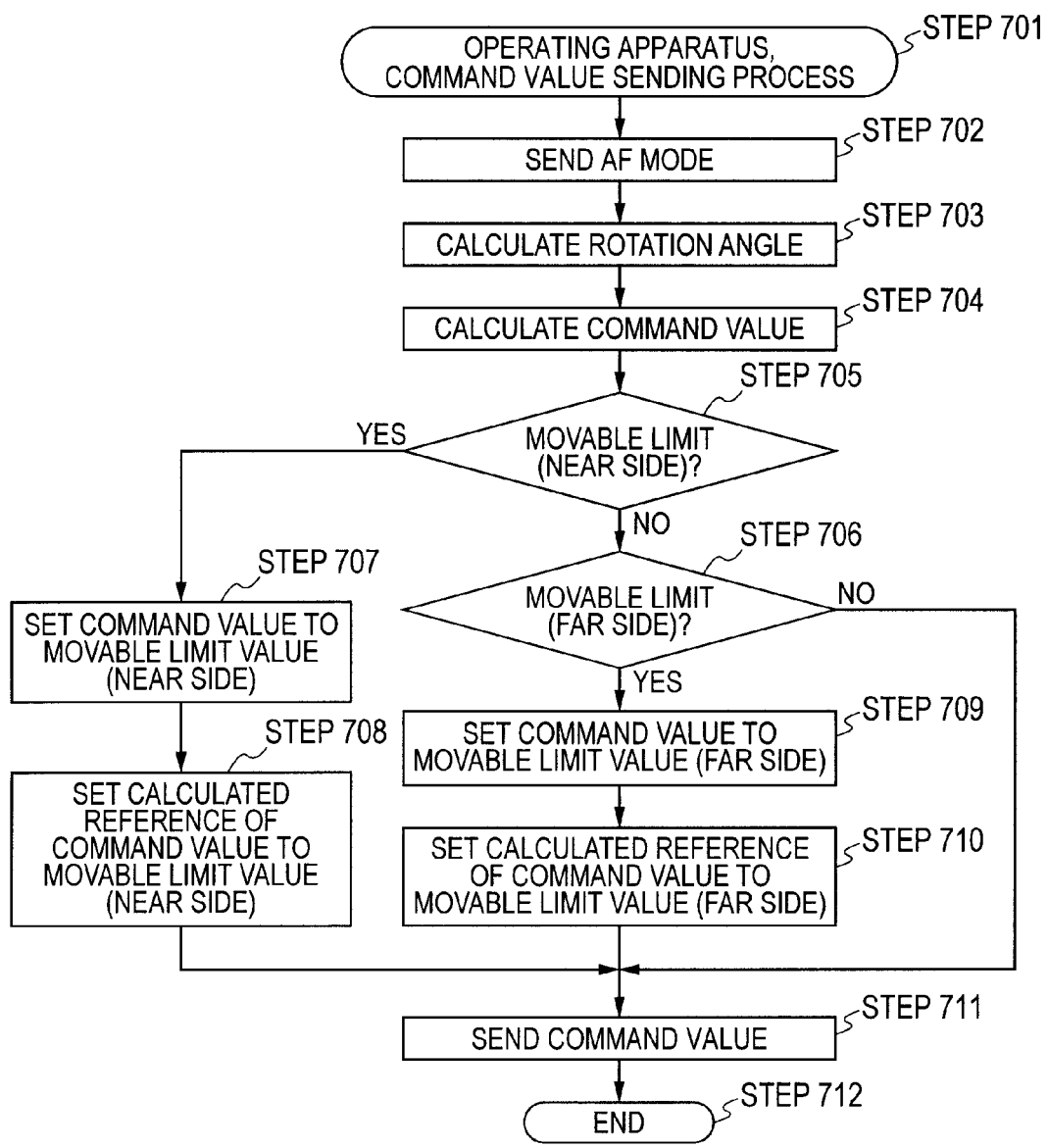
FIG. 13 is a flowchart illustrating a command value sending process of an operating apparatus in the fourth embodiment of the present invention.

FIG. 13 is a flowchart illustrating a command value sending process performed in the focus demand 117. The flow of the command value sending process in this embodiment is obtained by excluding the branch in Step 505 for the determination of whether or not the command value has changed and the sending step in Step 512 of discriminating command for operation out of driving range from the flow of the out-of-driving range operation discriminating command sending process in the third embodiment illustrated in FIG. 11, and hence the description is omitted. As illustrated in the flow of FIG. 13, in the fourth embodiment, the command value output from the focus demand takes a value in the driving range (movable range) between the movable limit position (far side) and the movable limit position (near side) as illustrated in FIG. 9.

As is apparent from the structure, the process flows, and the characteristics indicating the relationships between the rotation angle of the operating portion and each of the position command value and the lens position as illustrated in FIGS. 1, 9, 12, and 13, when the operating portion 118 is located out of the driving range, the set AF mode is changed to the manual mode. As a result, in a case where the operating portion 118 reaches a position out of the driving range during the AF mode, even when the command value is fixed, the control mode is not shifted to the AF mode. The control mode may be prevented from being shifted to the AF mode at an unintended timing for a photographer to cause an uncomfortable focus operation, and hence the operability may be improved.

Fifth Embodiment

Figure 14:
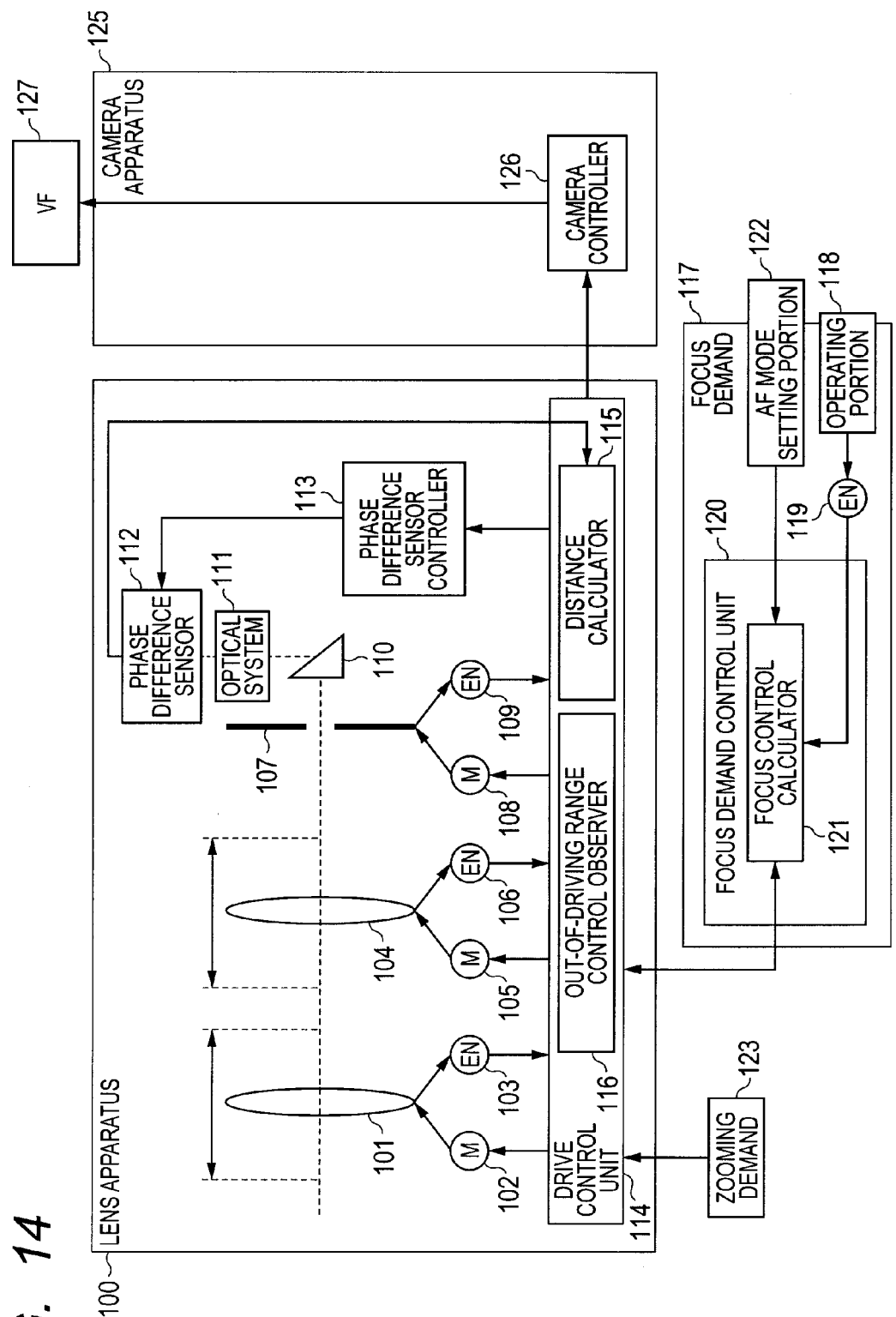
FIG. 14 is a block diagram illustrating a lens apparatus according to a fifth embodiment of the present invention.

FIG. 14 is a structural diagram illustrating an image pickup apparatus according to a fifth embodiment of the present invention.

In FIG. 14, the structures with the reference number 100 to 123 are the same as in FIG. 1, and hence the description is omitted. In the fifth embodiment, a camera apparatus 125 is connected to the lens apparatus 100 to communicate various data and commands therewith. A camera controller 126 included in the camera apparatus 125 performs communication control, image processing of image data obtained by shooting, and recording processing thereof. A view finder (VF) (information display portion) 127 displays a video image obtained by shooting and various setting and state information.

Figure 15:
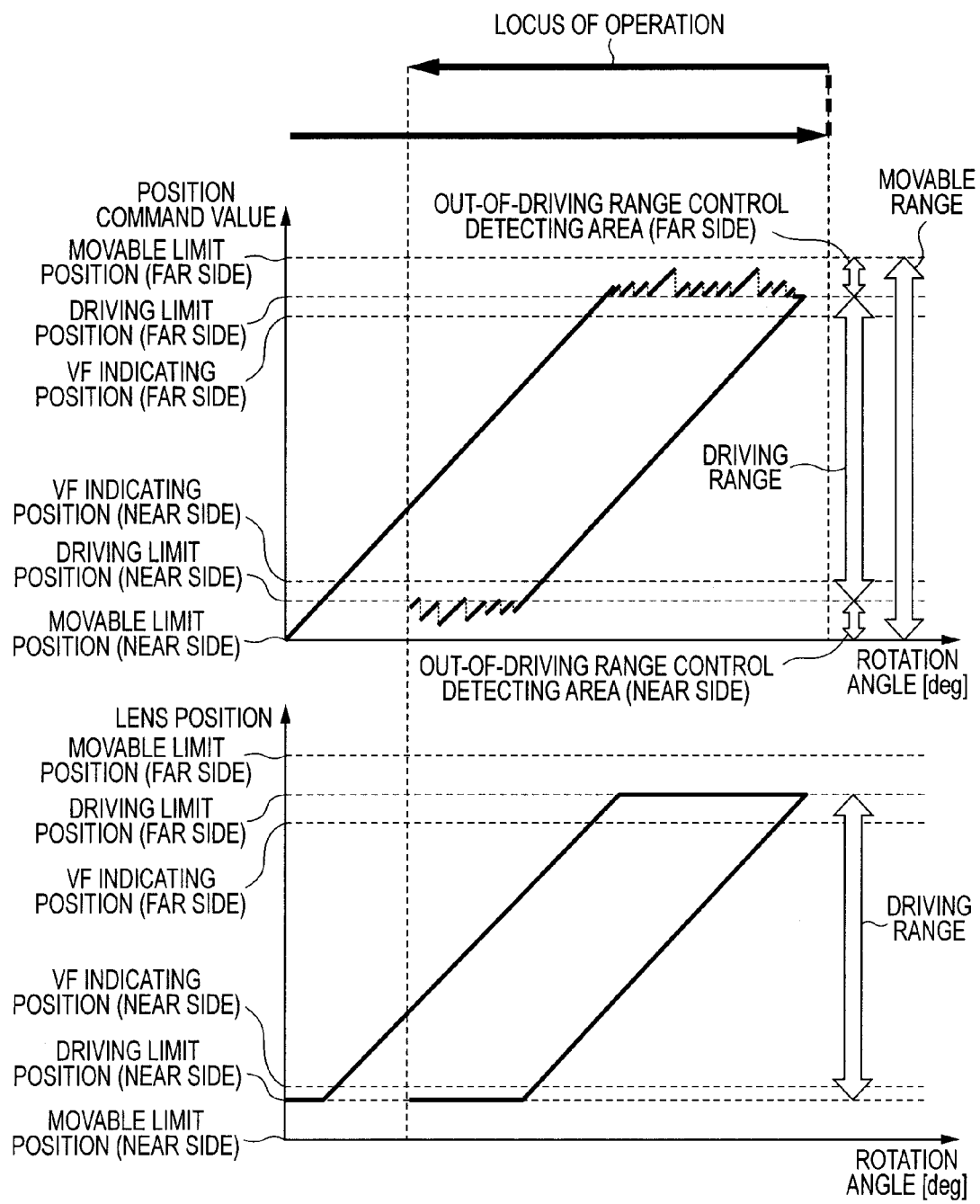
FIG. 15 illustrates relationships between a rotation angle of an operating portion and a position command value and between the rotation angle and a lens position in the fifth embodiment of the present invention.

FIG. 15 illustrates an example of a change in position command value output from the focus demand 117 during an out-of-driving range control observing process in a case where the operating portion 118 is operated out of the driving range in the fifth embodiment. In FIG. 15, the abscissa axis indicates the rotation angle of the operating portion 118 and the ordinate axes indicate the position command value output from the focus demand 117 and the lens position. The driving range, the movable range, the driving limit position (far side), the driving limit position (near side), the movable limit position (far side), the movable limit position (near side), the out-of-driving range control detecting area (far side), and the out-of-driving range control detecting area (near side) are the same as illustrated in FIG. 2, and hence the description is omitted. As in the case of FIG. 6, when the operating portion is operated out of the driving range, every reach of the command value to the movable limit position, the reference position of the command value is updated and the command value is changed to the driving limit position. As in the case of FIG. 2, it is assumed that the reference position is the driving limit position. As a result, as in the case of FIG. 2, when the operating portion 118 is operated out of the driving range, the position command value is not fixed to the driving limit position. Therefore, when the out-of-driving range control observer observes the change in command value which is caused corresponding to the operation, whether or not the operating portion is operated out of the driving range may be determined. In FIG. 15, a VF indicating position (near side) and a VF indicating position (far side) are alarm indicating positions used in an out-of-driving range control observing process 5 described later with reference to FIG. 16, and are set within the range between the driving limit positions (within driving range of focus lens 101) in this embodiment.

Figure 16:
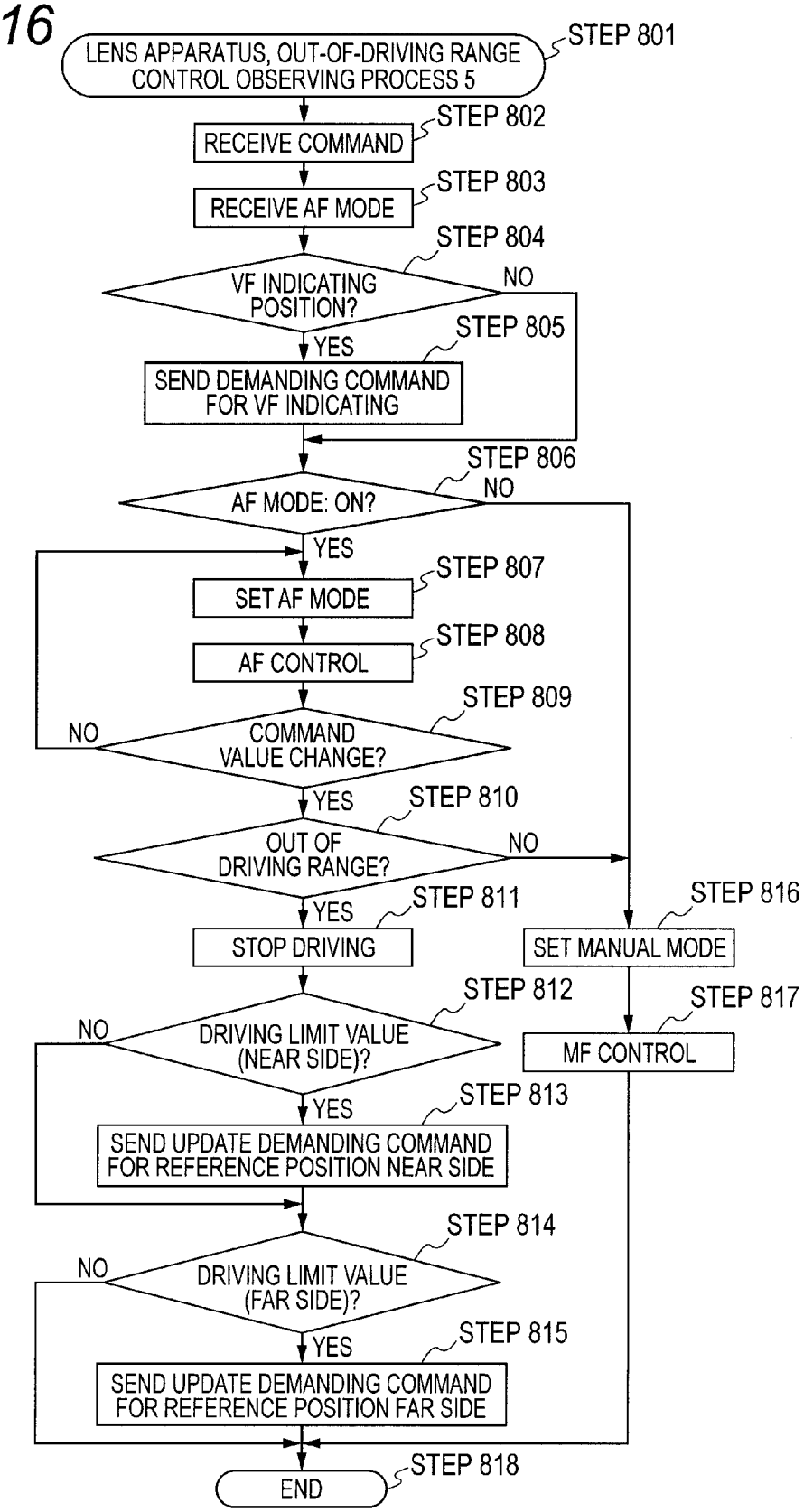
FIG. 16 is a flowchart illustrating an out-of-driving range control observing process of the lens apparatus according to the fifth embodiment of the present invention.

FIG. 16 is a process flowchart illustrating the out-of-driving range control observing process 5 of the drive control unit 114 in the structure described above. In FIG. 16, Step 801 to Step 803 and Step 806 to Step 818 are the same as Step 001 to Step 016, and hence the description is omitted. In Step 804, whether or not the focus lens 101 has reached the VF indicating position is determined. When the focus lens 101 has reached the VF indicating position, the processing goes to Step 805. When the focus lens 101 has not reached the VF indicating position, the processing goes to Step 806. In Step 805, a VF indicating demanding command is sent to the camera apparatus 125 and the processing goes to Step 806. Step 806 to Step 818 are the same the processing as Step 004 to Step 016 of the out-of-driving range control observing process 1 illustrated in FIG. 3 in the first embodiment. In Step 818, the out-of-driving range control observing process 5 is completed. After the completion, the same process is repeated from Step 801 at predetermined time intervals.

In Step 805, upon receiving the VF indicating demanding command from the drive control unit, the camera apparatus 125 may indicate, in a predetermined area of the view finder, an alarm exhibiting that the position of the focus lens has exceeded the VF indicating position and is close to the driving limit position.

In the structure described above, a command reference updating process performed in the focus demand 117 is the same flow as the command reference updating process 1 in the first embodiment illustrated in FIG. 4, and hence the description is omitted.

As is apparent from the structure, the process flows, and the characteristics indicating the relationships between the rotation angle of the operating portion and each of the position command value and the lens position as illustrated in FIGS. 3, 4, 14, 15, and 16, the VF indicating positions for the operating portion are set within the range between the driving limit positions. Therefore, the alarm is displayed on the view finder before the lens position reaches the driving limit position, and hence a photographer may determine in advance that the lens position is close to the driving limit position. As a result, the operating portion may be prevented from being operated out of the driving range and being rotated more than necessary while the photographer does not notice the operation. Thus, an ineffective operation time is reduced and the operability is improved. In this embodiment, each of the VF indicating positions corresponds to the single end point within the range between the driving limit positions. However, one more VF indicating position may be set for each of the driving limit positions.

The fifth embodiment is the example of the image pickup apparatus in which the view finder having the alarm indicating function is added to the structure described in the first embodiment. However, the present invention is not limited to this example. Even when the image pickup apparatus according to each of the second to fourth embodiments is provided with the same alarm indicating function, the same effect may be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298247, filed Dec. 28, 2009, which is hereby incorporated by reference herein in its entirety.

What is claimed is:

1. A lens system, comprising:
a lens apparatus including:
 a focus lens unit;
 a focus driving unit for driving the focus lens unit within a driving range; and
 a drive control unit which controls to drive the focus driving unit based on a position command; and
a focus operating apparatus including:
 a manual focus operating unit for a manual focus adjustment; and
 a manual focus command unit for outputting, to the drive control unit, a position command which indicates a position of the focus lens unit with respect to the driving range based on an operation amount of the manual focus operating unit,
wherein the manual focus operating unit is endlessly rotatable,
wherein the manual focus command unit is configured to output, to the drive control unit, the position command in a position command range wider than the driving range of the focus lens unit,
wherein if the position command is out of the driving range, the manual focus command unit updates the position command to a position command which corresponds to one of a close side end or an infinite side end of the driving range and is an end nearer to the position command out of the driving range, and
wherein the drive control unit drives the focus driving unit in a manual mode in which a focus adjustment is performed manually when the drive control unit determines that the position command changed during a predetermined period, and drives the focus driving unit in an autofocus mode in which the focus adjustment is performed automatically when the drive control unit determines that the position command did not change during the predetermined period.

2. The lens system according to claim 1, wherein:
when the position command reaches a close side end of the position command range, the manual focus command unit updates the position command to a position command corresponding to a close side end of the driving range; and
when the position command reaches an infinite side end of the position command range, the manual focus command unit updates the position command to a position command corresponding to an infinite side end of the driving range.

3. The lens system according to claim 1, wherein:
when the drive control unit determines that the position command output from the manual focus command unit to the drive control unit is out of the driving range of the focus lens unit and changes during the a predetermined period, the drive control unit sends an update demanding command to the manual focus command unit; and
when the manual focus command unit receives the update demanding command from the drive control unit, the manual focus command unit updates the position command to a position command corresponding to one of the close side end and the infinite side end of the driving range based on the update demanding command.

4. The lens system according to claim 1, further comprising an information display portion,
wherein when the position command from the manual focus command unit reaches an alarm indicating position which is set in a driving range of the focus lens unit, an alarm is displayed on the information display portion.

5. A focus control method for a lens system which comprises:
a focus lens unit;
a focus driving unit for driving the focus lens unit within a driving range;
a drive control unit for controlling to drive the focus driving unit based on a position command;
a manual focus operating unit for manual focus adjustment; and
a manual focus command unit for outputting, to the drive control unit, a position command which indicates a position of the focus lens unit with respect to the driving range based on an operation amount of the manual focus operating unit,
wherein the manual focus operating unit is mechanically endless and rotatable,
wherein the manual focus command unit is configured to output, to the drive control unit, the position command in a position command range wider than a driving range of the focus lens unit, and
wherein if the position command is out of the driving range, the manual focus command unit updates the position command to a position command which corresponds to one of a close side end or an infinite side end of the driving range and is an end nearer to the position command out of the driving range,
the focus control method comprising:
determining, by the drive control unit, whether or not the position command changes during a predetermined period,
driving the focus driving unit in a manual mode in which a focus adjustment is performed manually when the drive control unit determines that the position command changed during the predetermined period; and
driving the focus driving unit in an autofocus mode in which the focus adjustment is performed automatically when the drive control unit determines that the position command did not change during the predetermined period.

* * * * *